Figure 1:
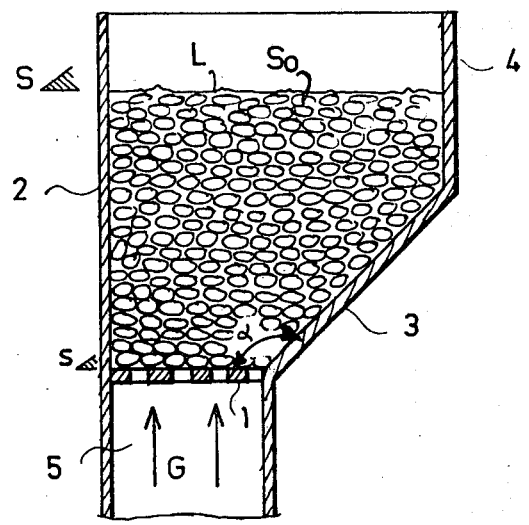
Figure 2A:
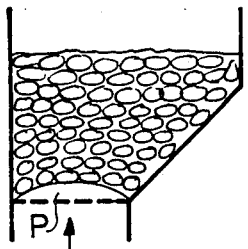
Figure 2B:
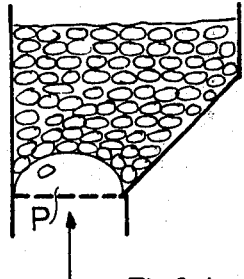
Figure 2C:
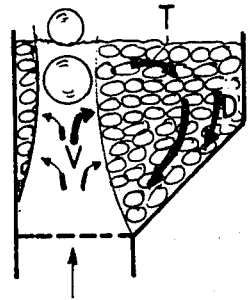
Figure 2D:
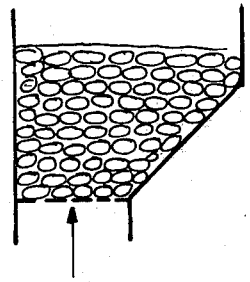

United States Patent [19]

Rios et al.

[11] 4,334,998
[45] Jun. 15, 1982

[54] PROCESS FOR PLACING A GAS PHASE, AT LEAST ONE LIQUID PHASE, AND AT LEAST ONE COMMINUTED SOLID PHASE IN CONTACT

[75] Inventors: Gilbert M. Rios; Henri Gibert; Jean-Louis Baxerres, all of Montpellier, France

[73] Assignee: Agence Nationale de Valorisation de la Recherche (A.N.V.A.R.), Neuilly sur Seine, France

[21] Appl. No.: 163,168

[22] Filed: Jun. 26, 1980

[30] Foreign Application Priority Data

Jun. 29, 1979 [FR] France ................ 79 17430

[51] Int. Cl.³ .................... C02F 3/08; B01J 47/10
[52] U.S. Cl. ................... 210/617; 210/661; 210/807; 422/140; 422/141; 422/145; 422/231
[58] Field of Search ............. 210/617, 618, 661, 715, 210/807; 422/139–141, 143, 147, 145, 231; 261/94, 122, 123

[56] References Cited

U.S. PATENT DOCUMENTS

| | | | |
|---|---|---|---|
| 3,754,993 | 8/1973 | Oguchi et al. | 210/661 |
| 3,855,120 | 12/1974 | Garbo | 210/618 |
| 4,046,684 | 9/1977 | Tsunoda et al. | 210/715 |
| 4,137,162 | 1/1979 | Mohri et al. | 210/661 |
| 4,165,568 | 8/1979 | Gibert et al. | 34/10 |

FOREIGN PATENT DOCUMENTS 1444959 5/1966 France.
2371227 6/1978 France ................ 422/231

Primary Examiner—Benoît Castel
Attorney, Agent, or Firm—Shlesinger, Arkwright, Garvey & Dinsmore

[57] ABSTRACT

The invention relates to contact-making between a gas phase, at least one liquid phase, and at least one comminuted solid phase.

The process uses a cell or compartment provided with at least one deflecting means such as the sloping wall 3 designed to impart an overall circulatory motion to the solid phase and with gas phase distributor 1, supplying this compartment with solid products, supplying this compartment with a liquid phase so as to cover entirely the solid when at rest, and feeding the compartment with the gas phase through the distributor 1 for the purpose of generating in said compartment a periodic pulsing stage consisting of gas-phase decompressions and layer contractions.

The invention permits achieving an intimate contact between three distinct phases for the purpose of transfer(s) or of reaction(s) between these phases.

12 Claims, 7 Drawing Figures

PROCESS FOR PLACING A GAS PHASE, AT LEAST ONE LIQUID PHASE, AND AT LEAST ONE COMMINUTED SOLID PHASE IN CONTACT

The invention concerns a process for bringing into contact at least three phases, a gaseous phase, at least one liquid phase, and at least one solid phase in the state of a comminuted solid product. The invention is applicable to those treatments where it is necessary to establish intimate contact between several phases which are different in nature, and in particular to ensure a transfer of matter between at least two of the phases (adsorption of part of the gaseous or the liquid phase on the solid phase, adsorption of part of the gaseous phase in the liquid phase, extraction by means of a solvent forming the liquid phase of solutes present on the solid phase, extraction by means of a liquid solvent of the solutes present in an inert liquid phase . . . ), or also to ensure a reaction, in particular a biochemical reaction involving at least two phases (aerobic or anaerobic fermentation of solid particles in a liquid medium, fermentation of a liquid phase by means of a gas, . . . ).

Frequently it is necessary, especially in the agro-food sector, to ensure intimate contact during a treatment between several distinct phases, and this contact-making in practice raises numerous problems; for instance in the agro-food sector, the practical difficulties are the following:

In the first place, the densities of the products frequently are very close to those of the liquid(s) used and sometimes the products are flat-shaped, thus they tend to float in the liquid phase: there is consequently very poor contact-making between the liquid and the solid phases, as these phases strongly tend toward a relative immobility.

Furthermore the solid phase particles sometimes adhere, so that they tend to clump and thereby the penetration of the liquid into the solid phase is hampered.

Furthermore as a rule it will be desirable to use the least volume of liquid (in particular to reduce dissolution in the liquid phase of the substances to be retained in the solid phase, or to extract the solutes with a minimal amount of solvent so as to facilitate their subsequent recovery from said solvent); this constraint worsens the contacting conditions cited above.

Lastly, it is frequently essential to use a gas phase to introduce a chemical element required for the proper course of a reaction, for instance oxygen for an aerobic biochemical reaction (fermentation, . . . ); in conventional processes, it is very difficult to achieve this intimate contact between this gas phase and the others; this gas phase, furthermore, by fixing itself in the form of microbubbles at the solid-liquid interfaces, tends to enhance the danger that the solid phase will float to the surface.

It is the object of the present invention to create a novel process for making contact and overcoming the foregoing difficulties.

Another object is to make possible intimate contact between a gas phase and at least one solid phase in the presence of a liquid phase of which the main purpose is to ensure the support of the solid phase(s) particles, which are not upwardly limited in grain size.

Another object is to make possible intimate contact between at least one solid phase and at least one liquid phase in the presence of a gas phase of which the purpose is to ensure the relative motion of the other phases.

Another object is to make possible intimate contact between a gas phase and at least one liquid phase in the presence of an inert solid phase of which the main purpose is to ensure a good dispersion of the fluid phases.

Another object is making possible intimate contact between at least two liquid phases in the presence of a solid phase of which the main purpose is to ensure good dispersion of the liquid phases and in the presence of a gas phase of which the purpose is to ensure the relative motion of the other phases.

To that end, the contact-implementing process of the invention and relating to a gas phase, to at least one liquid phase, and at least one solid phase in the form of a comminuted solid, consists in using at least one cell or compartment comprising on one hand at least one deflecting means designed to impart an overall circulatory motion to the solid phase around an approximately horizontal axis, and on the other hand a distributor means at its base fitted to feed the gas phase toward it and to retain within it the liquid phase, in feeding the solid product into the compartment so that at rest the solid will completely cover the feeder means, in supplying the liquid phase to the compartment in such a manner as to form a layer which in the rest condition substantially shall cover all of the solid, and in feeding a gas phase to the compartment through the feeder means so as to generate in said compartment a periodic pulsed state consisting of a sequence of gas-phase decompression stages accompanied by rising motions of the solid phase above the feeder means and of contraction stages in the layer during each of which the solid phase tends to return to a fixed-bed condition.

A preferred implementation mode of the invention consists in:

supplying a solid product with a density between that of the liquid phase and a limiting value of about 1.4 times this density to the compartment, the volume $V_s$ of the solid product being such that at rest in the compartment the solid shall entirely cover the feeder means at a height at least equivalent to two layers of particles of said product and of a maximum height approximately twice that of the deflecting means, supplying the liquid phase to the compartment in such a manner that the liquid volume $V_1$ present in it substantially covers the solid product at rest and at most equal 5 times the volume $V_s$ of said solid product, feeding the gas phase to the compartment through the distributor means at such a flow rate that the speed U of the gas in the compartment at its narrowest section on one hand be less than a critical value $U_c$ which is the boundary between a continuous flow state of the gas phase in the form of micro-bubbles through the layer of the solid product and an accumulation state at the base of that layer, and on the other hand be at most equal to a maximum value $U_E$ beyond which the liquid will be rapidly carried along by the gas phase in the pneumatic manner in the form of droplets.

Further, preferably compartments will be used that are each formed of a conduit provided at its base with a distributor means of cross section $\sigma$ and of at least one deflecting means consisting of a sloping wall starting at the level of the distributor means and forming with it an obtuse angle, so that the cross-section of the conduit increases from a minimum area s at the level of the distributor means to a maximum area S, such that $$s \geq \sigma \text{ and } 0.15 \leq s/S \leq 0.75$$

In order to better explain the above process, FIG. 1 shows in schematic form a cross-section of a basic compartment, while FIGS. 2a, 2b, 2c, 2d represent the various stages in one operational cycle. The FIG. 1 shows the distribution means 1 underneath of which the gas G is inflowing from a conduit 5, the conduit 2 with a cross-section s at the level of the feeder means and of maximum cross-section S at the upper part, the sloping wall 3, the solid particles $S_o$ and the interstitial liquid phase L.

When the process is implemented in the conditions defined above, a pulsed state can be observed in the compartment as shown in FIGS. 2a, 2b, 2c, 2d.

In a first stage (2a), a gas pocket P is at once created above the distribution means underneath the arch formed by the solid product particles suspended in the liquid phase.

This pocket arises from an accumulation of gas due on one hand to the speed U of the gas above the upper grid being above the critical speed $U_E$ for simple continuous flow, and on the other hand to a strong concentration of the solid product in view of the supply rates of solid and gas phases to the compartment.

The pocket P grows rapidly (FIG. 2b) until it explodes when the thrust of the gas retained underneath the arch exceeds the arch's weight.

Thereupon the gas is released in the form of large bubbles rising in the chimney (FIG. 2c) above the distribution means; motion is mutually transferred between the phases all along the rising path of the gas; liquid and solid particles are observed being carried along, first in the rising vertical direction V, next in the transverse direction T towards the sloping wall, then in the descending direction D along said wall (in the zone above the wall which is not fed with gas).

To this overall and regular circulating motion are superposed innumerable local and random phenomena of mutual displacements with three stages, displacements of slight amplitudes ascribed to the differences in inertia of the mutually present phases; the frequency of these local and random displacements and that of pocket formation are of the same order of magnitude, and at least several hertz. The combination of this overall circulation and these local displacements causes on one hand a remarkable contact-making between the three phases, due to the high frequency of the local displacements involving intense renewals at the contact interfaces, and on the other hand a homogeneity of treatment due the overall circulation which ensures that the elementary particles of the phases will be treated uniformly.

The various operational conditions of the process were determined empirically and must not be interpreted rigorously.

The recommended range of the area ratio s/S is so defined that an overall satisfactory circulation of the solid and liquid phases will be achieved.

The recommended density range for the solid product was chosen to permit both the rising motions of the solid immersed in the liquid phase and its descending motions, which are the basis of the above cited over-all circulation.

The range of bulks of solid products arranged in the compartment is set for the purpose of forming the gas pockets P thanks to an arch-effect while averting an excess of solid product which would require a division and feeding the gas bubbles to the upper part of the compartment and would decelerate the descending motion of the solid products.

The range of the liquid volumes is so set as to effectively suspend all the solid particles while averting excessive dispersion of these particles within the liquid phase which would degrade the formation and growth of the pocket P.

As regards the feed rate of the gas phase, experiments have shown that if this rate is less than the critical value $U_c$, the gas diffuses continuously between the solid particles and does not accumulate to form the pocket P. Beyond this critical value, however, which is empirically established for each particular case, the pocket can form by the accumulation of at least part of the gas.

It has been empirically observed that this critical value $U_c$ depends on the physical properties of the liquid phase (surface tension, viscosity), on the shape of the solid particles, on the relative densities of the liquid and solid phases, and on the geometry of the compartment as well as on the conditions inside it regarding filling with solid products and liquid phase.

The maximum speed $U_E$ which the gases may not exceed is determined by the pneumatic entraining conditions of the liquid phase, with a very rapid modification of the conditions of filling the compartment otherwise the result.

Furthermore, in a preferred operational condition of the purpose, a distribution means with a cross-section $\sigma$ equal to the minimum cross-section s of the conduit at the level of said feeder means is used, as illustrated in FIG. 1. This arrangement reduces the chances of dead zones at the base of the compartment.

Furthermore a compartment may be advantageously used which is such that the sloping side wall subtends an angle $\alpha$ with the distribution means which is about 120° to 150° and in particular nearly 135°, and for which the ratio s/S very roughly is of the order of 0.5. This geometry was found to be especially advantageous for a regular overall circulation without dead zones and for very intense local displacements of the phases with respect to one another.

Preferably the process is implemented with one or more solid products of which the average grain size exceeds 1 mm approximately; the buoyancy and gravity applying to each solid particle thus predominate over the surface forces acting on the solid particles (forces that are related to the surface tension, viscosity and solid/solid friction) that tend to slow-down the above cited local displacements.

Furthermore, a compartment or cell will be advantageously used of which the dimensions along the two coordinate axes at the level of the cross-section s each are at least ten times the average grain size of the comminuted product. In this manner the arch formation of the solid product is facilitated, and accordingly also the formation of the gas pocket below it.

The process of the invention can be implemented in discontinuous or continuous manner.

In the former case, the liquid and solid phases are placed in their totality into the compartment at the beginning of operation and are removed from it in totality at the end of operation.

In the latter case, at least one of the liquid or solid phases is supplied by continuously injecting it at a low rate into the compartment above the sloping wall, this phase being removed at the same rate from a zone in the compartment which is opposite to the supply zone. The term "low rate" means a flow imparting an incoming or outgoing speed to the phase, a low value with respect to the average speed of circulation of the products in the compartment, so as not to interfere significantly with said circulation.

The compartment may be continuously fed with gas phase, whether at a constant or variable flow rate; such supply also may be intermittent, consisting of gas-supply periods and of periods of supply-stoppage.

The process can be implemented with a single compartment or with several that are combined.

Figure 3:
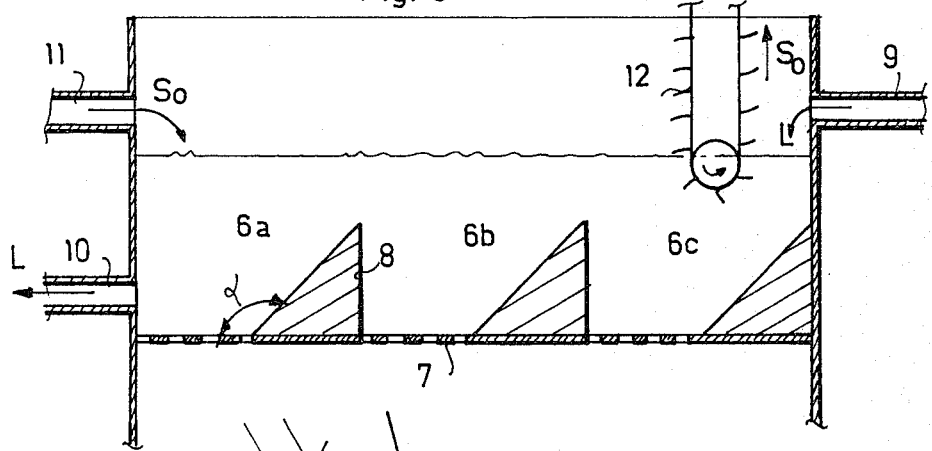
Figure 4:
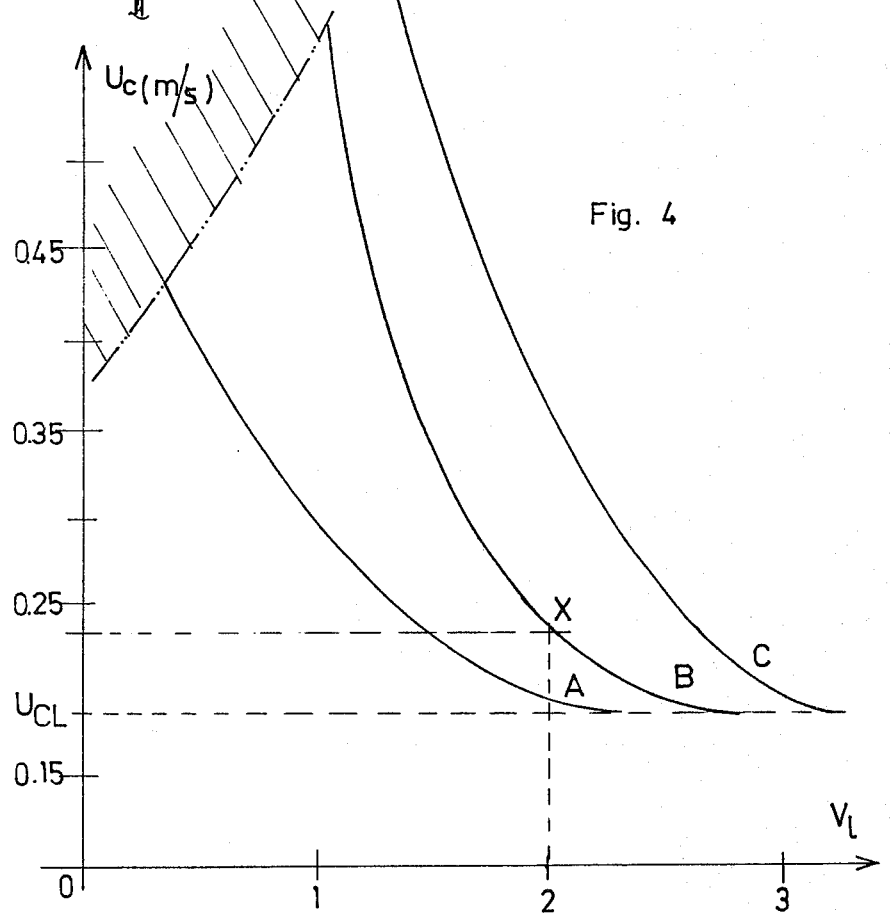

The description below relates to the attached drawings and shows in nonlimiting manner equipment embodiment modes and an example of implementation of the process of the invention; in these drawings:

FIG. 1, already referred to, is a vertical cross-section of the compartment;

FIGS. 2a, 2b, 2c, 2d, already referred to, are explanatory schematics of the principles of operation;

FIG. 3 is a cross-sectional schematic of a combination of compartments of the invention, FIG. 4 shows curves relating to the illustrative implementation.

The already described compartment shows in FIG. 1 may be cylindrical or prismatic. The sloping wall 3 may or may not be topped by a rising wall 4, in particular a vertical one. Obviously, the sloping wall 3 can be plane or otherwise, and be part of the conduit 2 or be offset from it (chute, baffle ...).

The distribution means 1 is of any known type suitable to prevent the liquid L from descending into the supply duct of the gas phase 5 (perforated plate, grid, sintered plate ...).

The equipment of FIG. 3 illustrates the process of the invention for several compartments of the above cited type 6a, 6b, 6c; these compartments are juxtaposed one against the other and supplied in parallel with the gas phase by their distribution meas. Latter consist of a grid 7 supporting chutes such as 8 which form the inclined walls of each compartment.

The ratio s/S for each compartment in the example provided is 0.5 and the angle α between the sloping wall and the feeder means is 135°.

The equipment shown in FIG. 3 may be used in particular to continuously perform a counterflow liquid/-solid extraction. To that end one injection conduit 9 for liquid is provided in one of the end compartments above the liquid level, and a withdrawal conduit 10 for liquid in another end compartment opposite to the injection conduit. Furthermore, means 11 for continuously supplying the solid phase are provided above the end compartment from which the liquid is withdrawn, whereas a system for removing the solid symbolically indicated at 12 is provided in the other end compartment in an area close to the injection conduit 9. The conventional removal means 12 may a mechanical system with mobile perforated troughs or any other known means allowing to remove solid particles immersed in a liquid medium.

In operation, the level of the liquid phase is located above the upper end of the chutes 8 so as to allow passing from one compartment to another, as well from the liquid phase (direction 6c→6a) as from the solid phase (direction 6a→6c).

The gas phase, air in particular (inert with respect to the other phases), ensures that in each compartment the conditions for mixing and for making intimate contact, which already were described, shall be met, whereby each of the compartments may be considered an ideal mixer.

The intimate contact made possible by the process of the invention between the liquid and solid phases determines an efficient extraction of the solutes in the solid particles by the liquid phase, which in this instance consists of a solvent of a suitable nature.

An illustrative implementation of the process of the invention will be described comprehensively below, and various applications will be indicated in a general manner.

EXAMPLE OF SOLID PRODUCTS MAKING CONTACT IN AN AQUEOUS MEDIUM

This example was carried out in discontinuous manner in a cylindrical compartment such as schematically shown in FIG. 1, with the following geometry:

sloping angle $\alpha = 135°$
$s = 57$ cm$^2$
$S = 290$ cm$^2$
$s/S = 0.2$

The solid products consist of large particles in the form flattened ellipsoids with a long and small axis resp. of 2 cm and 1 cm approximately and a thickness of about 0.5 cm. The average of grain size of these products, defined to be the average diameter of a sphere of the same volume, is 1 cm. The density of the product is about 1.1 g/cm$^3$.

The liquid phase consists of water and the gas phase of air.

The filling conditions were varied for the compartment, so as to establish from several tests the corresponding critical speeds $U_c$.

The curves of A, B, C of FIG. 4 show the operation with amounts of solid products of 550 g, 1,100 g and 1,650 g resp. The abscissa shows the volumes of water in liters in the compartment and the ordinate the corresponding critical speeds $U_c$.

For instance, filling 1,100 g of solid products and 2 liters of water (point X in curve B) result in a critical speed $U_c$ of about 0.23 m/s. Below this speed, the air slowly diffuses through the layer of solid products and will not accumulate to form a pocket. Starting at that speed, the pulsing phenomenon characteristic of the invention will appear with its desired results.

The above research was carried out taking into consideration the other process constraints, to wit:

the liquid volume is chosen to be such that it will entirely cover the layer of solid products at rest (not exposed to the gas phase), which in this instance is given by the condition $V_1/V_s \geq 1$ (the inoperative zone is shown shaded in FIG. 4), the liquid volume is chosen to be such that the ratio $V_1/V_s$ will be less than 5 for all the curves.

It will be noted in the above example that when the volume $V_1$ of the liquid increases, curves A, B, C approach a critical boundary value $U_{CL}$ of about 0.18 m/s. In all procedures, the gas speed must exceed this value in this application.

When the process conditions are observed, there will be an effective suspension of each solid particle in the aerated liquid medium, and a homogeneous treatment for all particles, without their accumulating at the surface; furthermore, there is no adhesion observed among the solid particles, despite their natural tendency to do so.

In the conventional 3-phase fluidized beds made from these products and the like, on the contrary, a sort of caking of agglomerating solid particles always appears at the bed surface, interfering with proper treatment, for instance a fermentation reaction.

Furthermore, as regards the process of the invention, the solid particles are still intact at the end of the operation, without any damages to their surfaces, contrary to the case of a conventional fermentation means with a mechanical agitator.

There are many applications for the contact-making process of the invention:

It may be implemented to achieve a biochemical reaction with at least two phases such as is the case for instance in the above described hydrodynamics; this is also the case for fermenting, for instance domestic composting or liquid fermentations.

The process also may be implemented to achieve matter transfers between at least two phases:

extraction of aromatic, dyeing or other substances by solvents from a solid or liquid phase, adsorption of aromatic or dyeing or other substances on solid particles, adsorption of substances initially in the gas phase into a liquid phase.

In these applications, the phases at the same time may play a role in the transfer mechanism and the contact-making mechanism, or they may have the single function of making contact with the other phases in conformity with the process of the invention.

We claim:

1. A process for placing in contact at least three phases comprising a gaseous phase, a liquid phase and a solid phase wherein said solid phase comprises a particulate solid having a density between the density of said liquid phase and 1.4 times the density of said liquid phase, the process comprising providing a compartment having a base comprising feeder means including distributor means of a cross-section area $\sigma$ and a deflector means comprising a sloping side wall rising from said distributor means at an obtuse angle thereto so that the cross-sectional area of the compartment increases from a minimum area s at the level of the distributor means to a maximum area S where $s \geq \sigma$ and $0.15 \leq s/S \leq 0.75$, supplying said solid phase to said compartment such that the volume $V_s$ of the solid phase is sufficient to cover said distributor means to a depth equivalent to at least two layers of the said particles, supplying said compartment with a volume $V_1$ of said liquid sufficient at least to cover said solid phase at rest and at most equal to five times the volume $V_s$ of the solid phase, feeding a gas through said distributor means into said compartment so as to generate a periodic pulsing in said liquid as said gas passes therethrough, maintaining the flow rate of said gas such that the average gas velocity U at the narrowest cross-section of said compartment is at least equal to a critical boundary value $U_c$ between a continuous flow state of the gas in the form of microbubbles through the solid product layer and a state of accumulation at the base of the solid product layer and at most equal to a maximum value $U_E$ above which the liquid phase is entrained in the gas, whereby said gas flow produces a generally circulatory motion of said liquid and solid phases in said compartment about an approximately horizontal axis.

2. A process as in claim 1 and wherein said feeder means has a cross-sectional area substantially equal to the minimum cross-sectional area of said compartment at the level of said distributor means.

3. A process as in claim 1 or 2 and wherein said sloping wall forms an angle of about 120° to 150° with said distributor means.

4. A process as in claim 1 or 2 and wherein the ratio s/S is approximately 0.5.

5. A process as in claim 1 or 2 and wherein said solid product has an average grain size of at least about 1 mm.

6. A process as in claim 1 or 2 and wherein the dimensions of said compartment at the level of said distributor means are at least 10 times the average grain size of said solid product.

7. A process as in claim 1 and including carrying out said process in a batch-wise manner by supplying said liquid and solid phases to said compartment in toto at the beginning of operation and removing said liquid and solid phases in toto at the end of operation.

8. A process as in claim 1 and including supplying one of said liquid phase and said solid phase continuously to said compartment above said sloping wall and removing said one of said liquid phase and said solid phase continuously at a zone of said compartment opposite to the feed.

9. A process as in claim 1, 7 or 8 and including supplying said gas intermittently into said compartment.

10. A process as in claim 1 and including providing a plurality of said compartments in side by side relationship and feeding said gas into each of said compartments in parallel.

11. A process as in claim 1 and including selecting said phases so as to provide transfer of matter between at least two of said phases.

12. A process as in claim 1 and including selecting said phases so as to carry out a biochemical reaction involving at least two of said phases.

* * * * *